US012748868B2

(12) United States Patent
Bhandarkar

(10) Patent No.: US 12,748,868 B2
(45) Date of Patent: Sep. 29, 2026

(54) AUTHENTICATION USING CREDIENTIALS CACHED AT MULTI-FUNCTION DEVICE

(71) Applicant: Konica Minolta Business Solutions U.S.A., Inc., Ramsey, NJ (US)

(72) Inventor: Pranay Bhandarkar, Union City, CA (US)

(73) Assignee: Konica Minolta Business Solutions U.S.A., Inc., Ramsey, NJ (US)

( * ) Notice: Subject to any disclaimer, the term of this patent is extended or adjusted under 35 U.S.C. 154(b) by 261 days.

(21) Appl. No.: 18/129,470

(22) Filed: Mar. 31, 2023

(65) Prior Publication Data

US 2026/0037649 A1 Feb. 5, 2026

(51) Int. Cl.

| | |
|---|---|
| ***G06F 21/60*** | (2013.01) |
| ***G06F 21/32*** | (2013.01) |
| ***G06F 21/34*** | (2013.01) |
| ***H04L 9/40*** | (2022.01) |

(52) U.S. Cl.

CPC ............ *G06F 21/608* (2013.01); *G06F 21/32* (2013.01); *G06F 21/34* (2013.01); *H04L 63/0807* (2013.01); *H04L 63/0853* (2013.01); *H04L 63/0861* (2013.01)

(58) Field of Classification Search

CPC ............... G06F 21/608; H04L 63/0807; H04L 63/0861; H04L 63/101; H04L 63/102; H04L 63/104

See application file for complete search history.

(56) References Cited

U.S. PATENT DOCUMENTS

| | | | | |
|---|---|---|---|---|
| 2005/0206501 A1* | 9/2005 | Farhat | G07C 9/257 | 340/5.82 |
| 2009/0282465 A1* | 11/2009 | Narita | G06F 21/31 | 726/6 |
| 2016/0191746 A1* | 6/2016 | Yokoyama | G06V 40/10 | 358/1.14 |
| 2023/0140229 A1* | 5/2023 | Lang | G06F 21/45 | 726/19 |

FOREIGN PATENT DOCUMENTS

| | | |
|---|---|---|
| JP | 2015176194 A | 10/2015 |
| JP | 2018198400 A | 12/2018 |
| WO | 2010046985 A1 | 4/2010 |

OTHER PUBLICATIONS

Office Action issued on Jun. 10, 2025, by the Japanese Patent Office in corresponding Japanese Patent Application No. 2024-036683, and a machine English Translation of the Office Action. (11 pages).

* cited by examiner

*Primary Examiner* — Theodore C Parsons
(74) *Attorney, Agent, or Firm* — Buchanan Ingersoll & Rooney PC

(57) ABSTRACT

A method, a non-transitory computer readable medium, and a multifunction peripheral or multifunction printer that includes a method for enhanced authentication. The method includes: receiving authentication information from a client device on a computer system; comparing the authentication information received from the client device to authentication information in a list of authorized users hosted in a cache of the computer system; and authenticating a user for access to the computer system when the authentication information received from the client device corresponds to the authentication information associated with the user in the list of authorized users in the cache of the computer system.

21 Claims, 6 Drawing Sheets

AUTHENTICATION USING CREDIENTIALS CACHED AT MULTI-FUNCTION DEVICE

FIELD OF THE DISCLOSURE

The present disclosure generally relates to a method and system for enhanced authentication, and more particularly, to a method and system for enhanced authentication times of users on multifunction peripherals or multifunction printers (MFP) with faster login.

BACKGROUND

Multifunction peripherals or multifunction printers (MFP) often require users to login so that the managed print services (MPS) can be implemented. The managed print services can include, for example, user authentication that control identities of users, which can help ensure that users have been authenticated at the MFP before a print job is released and/or printed. In addition, managed print services allow administrators to track and monitor usage in real time through regular, scheduled and on-demand reporting, management, and charge back of costs by assigning users to cost centers, entering of billing or project codes before printing a document. Managed print services can also create print rules or policies, which can help ensure, for example, cost management by allowing different user roles to access different devices and features. For example, duplex printing and/or color printing may be allowed by certain individuals and/or groups and not permitted to other individuals and/or groups.

As more authentication methods are added, for example, through the use biometric identifiers and the like for accessing multifunction peripherals or multifunction printers (MFP), each of the authentication methods need to be supported by the MFP, which can require software updates and the like. In addition, the authentication time with biometric verification or multifactor authentication often takes longer time than desired or expected.

Accordingly, it would be desirable to have a method and system for enhanced authentication times for faster login by creating a list of users that is cached on the MFP, and can provide for a plurality of users to be authenticated by the MFP, rather than an authentication system that is not hosted on the MFP. In addition, the method and system for enhanced authentication times can create, for example, a cache list for the users who, for example, are in the vicinity of a particular MFP that can provide faster login times, as the communication through multiple or a plurality of hops can be eliminated to an authentication system and single cache can provide authentication including an authentication token to authenticate a user.

SUMMARY

In consideration of the above issues, it would be desirable to have a method and system that improves the speed of authentication for users utilizing an overall company infrastructure that provide for faster login, for example, for access to multifunction peripherals or multifunction printers (MFP).

In accordance with one aspect, a method for enhanced authentication, the method comprising: receiving authentication information from a client device on a computer system; comparing the authentication information received from the client device to authentication information in a list of authorized users hosted in a cache of the computer system; and authenticating a user for access to the computer system when the authentication information received from the client device corresponds to the authentication information associated with the user in the list of authorized users in the cache of the computer system.

In accordance with another aspect, a computer program product for accessing a multifunction peripheral, the computer program product comprising: a non-transitory computer-readable storage medium having program instructions embodied therewith, the program instructions executable by a computer to cause the computer to perform a process, comprising: receiving authentication information from a client device on the computer; comparing the authentication information received from the client device to authentication information in a list of authorized users hosted in a cache of the computer; and authenticating a user for access to the computer when the authentication information received from the client device corresponds to the authentication information associated with the user in the list of authorized users in the cache of the computer.

In accordance with a further aspect, a multifunction peripheral comprising: a cache; and a processor configured to: receive authentication information from a client device; compare the authentication information received from the client device to authentication information in a list of authorized users hosted in the cache of the multifunction peripheral; and authenticate a user for access to the multifunction peripheral when the authentication information received from the client device corresponds to the authentication information associated with the user in the list of authorized users in the cache of the multifunction peripheral.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
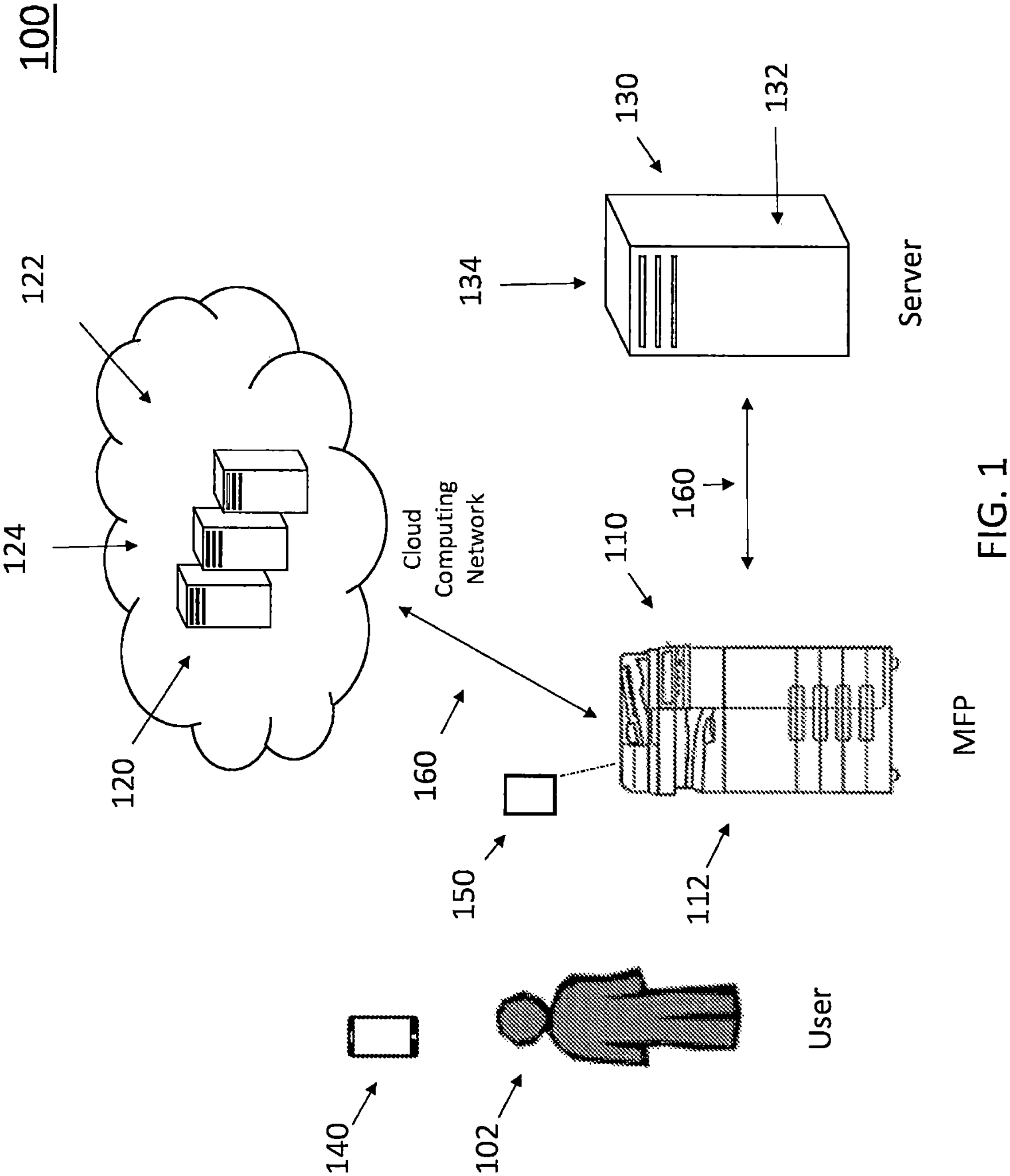
FIG. 1 is an illustration of a system for authenticating users on a computer system in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is an illustration of a system 100 for authenticating users 102 on a computer system 110 in accordance with an exemplary embodiment. As shown in FIG. 1, the system 100 can include a computer system 110, for example, a multifunction peripheral or multifunction printer (MFP) 112 and one or more computer system 120, 130, which can be configured to host, for example, one or more of managed print services (MPS) 124, 134. The one or more managed print services 124, 134, for example, can be hosted on one or more servers 122, 132, which can include, for example, a cloud server 122.

The system 100 can also include a user 102, and a client device 140 that can authenticate that the user 102, for example, for access to the computer system 110 as disclosed herein. In accordance with an embodiment, the client device 140 can be, for example, a mobile client, for example, a smart phone, a smart tablet, smart watch, or a biometric band that can be used an authentication device, for example, for authentication of the user 102 on the computer system 110. The authentication of the user 102 on the computer system 110 can be, for example, a FIDO authentication workflow for access to the computer system 110, for example, a multifunction peripheral or multifunction printer 112, and managed print services 124, 134 that can be hosted on the computer systems 120, 130. The computer system 110 can be configured, for example, to receive communications from a client device 140 via a near-field communication (NFC) or Bluetooth protocol.

The one or more computer systems 110, 120, 130, and the client device 140 can include a processor or central processing unit (CPU), and one or more memories for storing software programs and data. The processor or CPU carries out the instructions of a computer program, which operates and/or controls at least a portion of the functionality of the devices the one or more computer systems 110, 120, 130, and the client device 140. The one or more computer systems 110, 120, 130, and the client device 140 can also include an operating system (OS), which manages the computer hardware and provides common services for efficient execution of various software programs. For example, the software programs can include application software, for example, for managing an authentication module and/or biometric identifier, and/or printer driver software, for example, for one or more of the computer systems 110, 120, 130, for example, the computer system 110, for example, the multifunction peripheral or multifunction printer 112.

In accordance with an embodiment, the computer system 110 can be a multifunction peripheral or multifunction printer (MFP) 112, which can include at least a copy function, an image reading function, a facsimile (fax) function, and a printer function, and forms an image on a sheet based on a print job multifunction peripheral (print instruction) received, for example, from the computer system 110. The multifunction peripheral or multifunction printer 112 preferably includes a cache 150, which hosts an identify of one or more users 102 that can be authenticated, for example, while in a vicinity of one or more multifunction peripherals or multifunction printers 112 as disclosed herein.

The computer system 110 can alternatively, for example, be a medical device or a medical apparatus, which can be used, for example, for diagnostic and/or therapeutic purposes. Examples of medical devices or medical apparatuses can include medical imaging devices, which can obtain, for example, radiological, angiographic, sonographic, and/or tomographic images. Alternatively, for example, the computer system 120, 130 can be, for example, a back-end database, or enterprise database system, which can be accessed by the one or more users indirectly through an external application, for example, through the computer system 110.

In accordance with an embodiment, when the computer system 110 is a multifunction peripheral or multifunction printer (MFP) 112, the one or more computer systems 120, 130 can be configured to host, for example, managed print services (MPS) 124, 134. The managed print services 124, 134 can include, for example, one or more of user authentication, monitoring and reporting, user and cost management, cost accounting and budget management, printer queue management, and workflow management. For example, user authentication can include control over identities of user, which can help ensure that users have been authenticated at a device before a print job is released and/or printed. The monitoring and report features can allow administrators to track and monitor usage in real time through regular, scheduled and on-demand reporting. The user and cost management feature can help manage and charge back costs by assigning users to cost centers, or enabling them to select the relevant cost center, billing or project code before printing a document. In addition, the user and cost management feature can be used to create print rules or policies, which can help ensure tighter cost management by allowing different user roles to access different devices and features. For example, the user and cost management feature can control, for example, duplex printing and/or color printing to individuals and/or groups. In addition, cost accounting and budget management provides for cost control and flexibility, which can be used as a print management solution that allows administrators to assign print budgets to users, with the option to top up their accounts. For example, in an environment such as a university, for example, this allows administrators to give students a free print quota that they can add to as required. In addition, a print queue management can be used for manage of individual production in addition to office print queues in an office, for example.

The one or more computer systems 110, 120, 130, and the client device 140 can be connected via a communication network 160. The communication network 160 may include, for example, a conventional type of network, wired or wireless, and may have any number of configurations, such as a star configuration, token ring configuration, or other known configurations. The communication network 160 may include one or more local area networks ("LANs"), wide area networks ("WANs") (e.g., the Internet), virtual private networks ("VPNs"), peer-to-peer networks, near-field networks (e.g., Bluetooth®), cellular networks (for example, 3G, 4G, 5G, other generations), and/or any other interconnected data path across which multiple computing nodes may communicate.

Data may be transmitted in encrypted or unencrypted form between the one or more computer systems 110, 120, 130, and the client device 140 using a variety of different communication protocols including, for example, various Internet layer, transport layer, or application layer protocols. For example, data may be transmitted between the one or more computer systems 110, 120, 130, and the client device 140 via the network 160 using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), file transfer protocol (FTP), WebSocket (WS), wireless access protocol (WAP), various messaging protocols (SMS, MMS, XMS, IMAP, SMTP, POP, WebDAV, etc.), or other known protocols.

As shown in FIG. 1, the user 102 can present an authenticator to the computer system 110. The authentication of the user 102 on the computer system 110 can be via, for example, the client device 140 via a near-field communication (NFC) or Bluetooth. For example, the user 102 can be authenticate on the client device 140, which can be, for example, a security identification and authentication device (or authenticator), which uses automated methods of verifying or recognizing the identity of a living person based on a physiological or behavioral characteristic. Thus, the user need not to manually input passwords to the computer system 110, for example, the multifunction peripheral or multifunction printer 112. The method of recognizing the user 102 can include, for example, fingerprints, electrocardiogram (ECG or EKG) information, facial images, iris, and voice recognition. For example, in accordance with an exemplary embodiment, the client device 140 can be a wearable device, for example, a Nymi™ band, which detection of the user 102 is based on the electrocardiogram (ECG) and its unique properties, e.g., electrical activity of the heartbeat of the user (e.g., wearer) 102.

For example, authentication via the client device 140 can include the presentation, for example, of mobile device, smart phone, or smart watch of the user 102 to a vicinity of the authenticator (e.g., client device 140) via a near-field communication (NFC) network (e.g., Bluetooth®) and wherein the user 102 has previously been authenticated on the mobile device or smart phone by one or more of a user identifier (ID) and password and/or a biometric identifier, for example, facial recognition, fingerprint, of the like.

In accordance with an exemplary embodiment, the authentication of the user 102 on the client device 140 can be a biometric identifier, which is a distinctive, measurable characteristics used to label and describe or identify an individual, including a metric related to human characteristics. For example, the biometric identifier can include physiological characteristics of an individual including but not limited fingerprints, palm veins, face recognition, DNA (or deoxyribonucleic acid), palm print, hand geometry, iris recognition, retina, and/or odor/scent.

Figure 2:
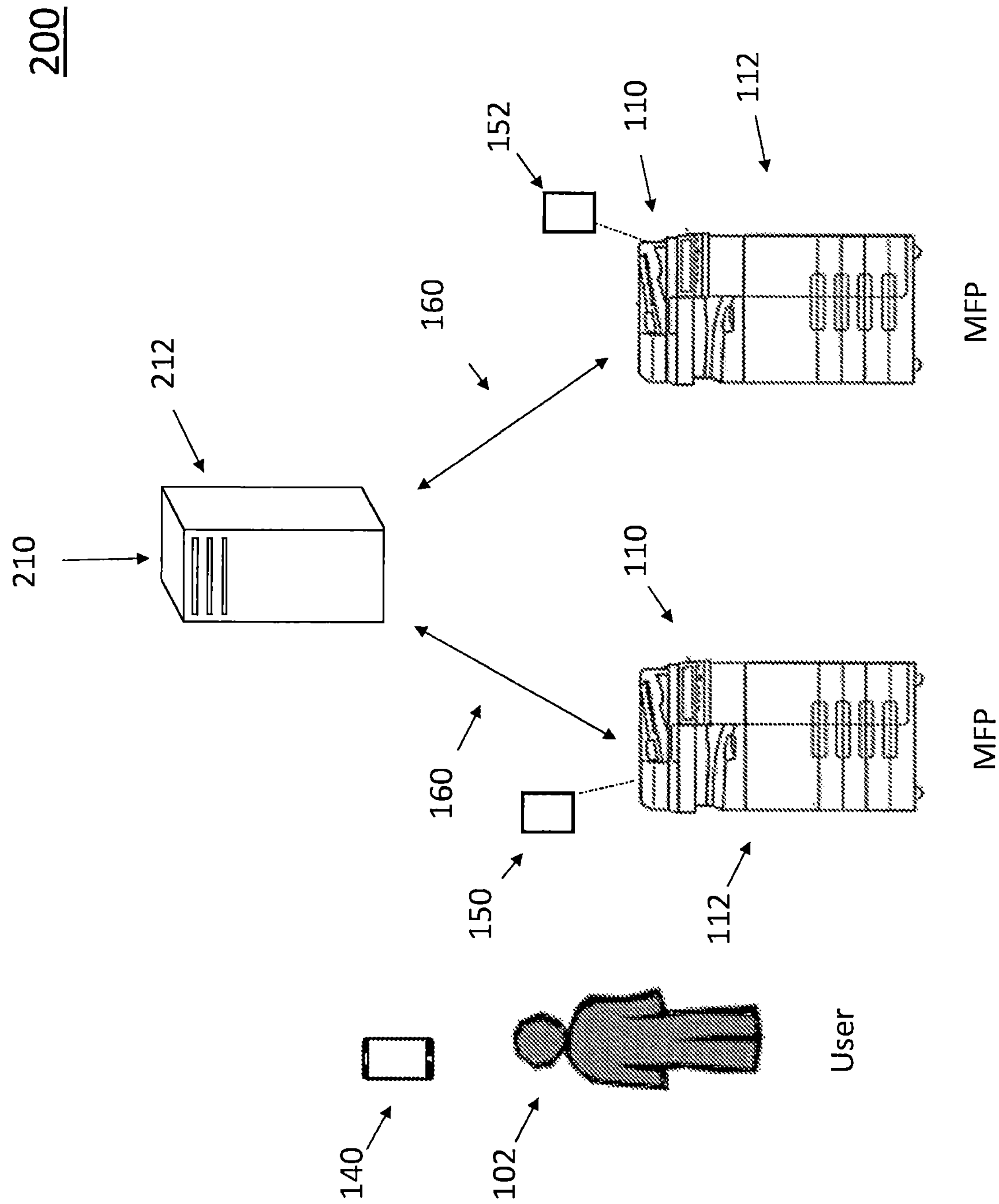
FIG. 2 is an illustration of another system for authentication users on a computer system in accordance with an embodiment.

FIG. 2 is an illustration of another system 200 for authenticating a user on a computer system 110 in accordance with an embodiment. As shown in FIG. 2, the system 200 can include one or more computer systems 110, for example, in the form of a multifunction peripheral or multifunction printer (MFP) 112 that can authenticate a user 102 via a list of authenticated users for each of the one or more computer systems 110. For example, the list of authenticated users 102 for each of the one or more computer systems 110 can be a cache list 150, 152 that is hosted by the one or more computer systems 110. In accordance with an embodiment, the cache list 150, 152 of the authenticated users 102 can be different for each of the one or more computer systems 110. In addition, the cache list 150, 152, for example, can be an encrypted cache list.

For example, in accordance with an embodiment, a user 102 can access the one or more computer systems 110 via a mobile application that authenticates the user on the mobile device 140 via an authentication protocol. The user 102 can be authenticated, for example, using a single sign-on (SSO) authentication scheme or protocol. For example, the single sign-on (SSO) authentication scheme or protocol can authenticate the user 102 or digital identity of the user 102 via an identity provider (IdP). As shown in FIG. 2, the computer system 110 receives the request and will forward the authentication request to an identity provider (IdP) 212, for example, hosted by a computer system 210. The identity provider (IdP) 212 can be configured to store and manage digital identities of one or more users 102. The identity provider (IdP) 212 can check the user's 102 identity via the authenticator, for example, via username-password combinations and other factors including biometric factors. In addition, the identity provider (IdP) can authenticate any entity connected to a network or a system, for example, the computer system 110, 140. In particular, the identity provider (IdP) 212 can be used in a cloud computing environment to manage user identities. In accordance with an embodiment, if the user 102, or alternatively, the user 102 and the computer system 110 has been authenticated by the identity provider (IdP) 212, the computer system 110 associated with the identity provider (IdP) 212 can send an authentication token (for example, which can include a user identity and authentication cookie) to the computer system 110 for the user 102 and/or the user 102 and the computer system 110. In addition, once a user 102 has been authenticate, the authenticator, for example, a biometric identifier or biometric authentication sequence, can be stored in a cache list 150, 152, for the next time the user 102 wishes to access the computer system 110 for enhanced authentication in accordance with an exemplary embodiment.

In accordance with an embodiment, users 102 via a mobile application can identify, for example, as favorites, one or more of the one or more computer systems 110. The one or more of the one or more computer systems 110 that have been listed as favorites for a user 102 can pre-calculate, for example, a biometric authentication sequence for the user 102 to help improve an authentication time for the user 102. Accordingly, when the user 102 comes into contact with the one or more computer systems 110, the mobile device 140 of the user 102 can send a biometric identifier to the one or more computer systems 110 that can authenticate the user 102 via the cache list 150, 152. For example, the cache list 150, 152 can includes a biometric authentication sequence that corresponds or authenticates the user 102 based on the receive biometric identifier from the mobile device 140 of the user 102.

In accordance with another embodiment, using an administrative tool, users 102 can be added to the one or more computer systems 110, for example, one or more MFPs 112, by adding a group of employees (i.e., a plurality of users 102) working, for example, on a same floor, in a lab, or a working bay to generate the cache list 150, 152 for employees that regularly use or need access (e.g., daily use) to one or more of the MFPs 112. Thus, by creating the cache list 150, 152 via an administrative tool, the users 102 can be pre-cached, for example, in the MFP client of the MFP 112, which can help reduce the time necessary for authentication of one or more of the plurality of users 102.

In accordance with a further embodiment, the user 102 can designate one or more favorite computer systems 110, for example, MFPs 112, via a remote application on a mobile device 140 or other computer system. For example, before visiting an office or location, the MFPs 112 can be preset with users 102 that intend to use the MFP 112 with biometric authenticators or biometric authentication sequences for each of the one or more users 102.

Figure 3:
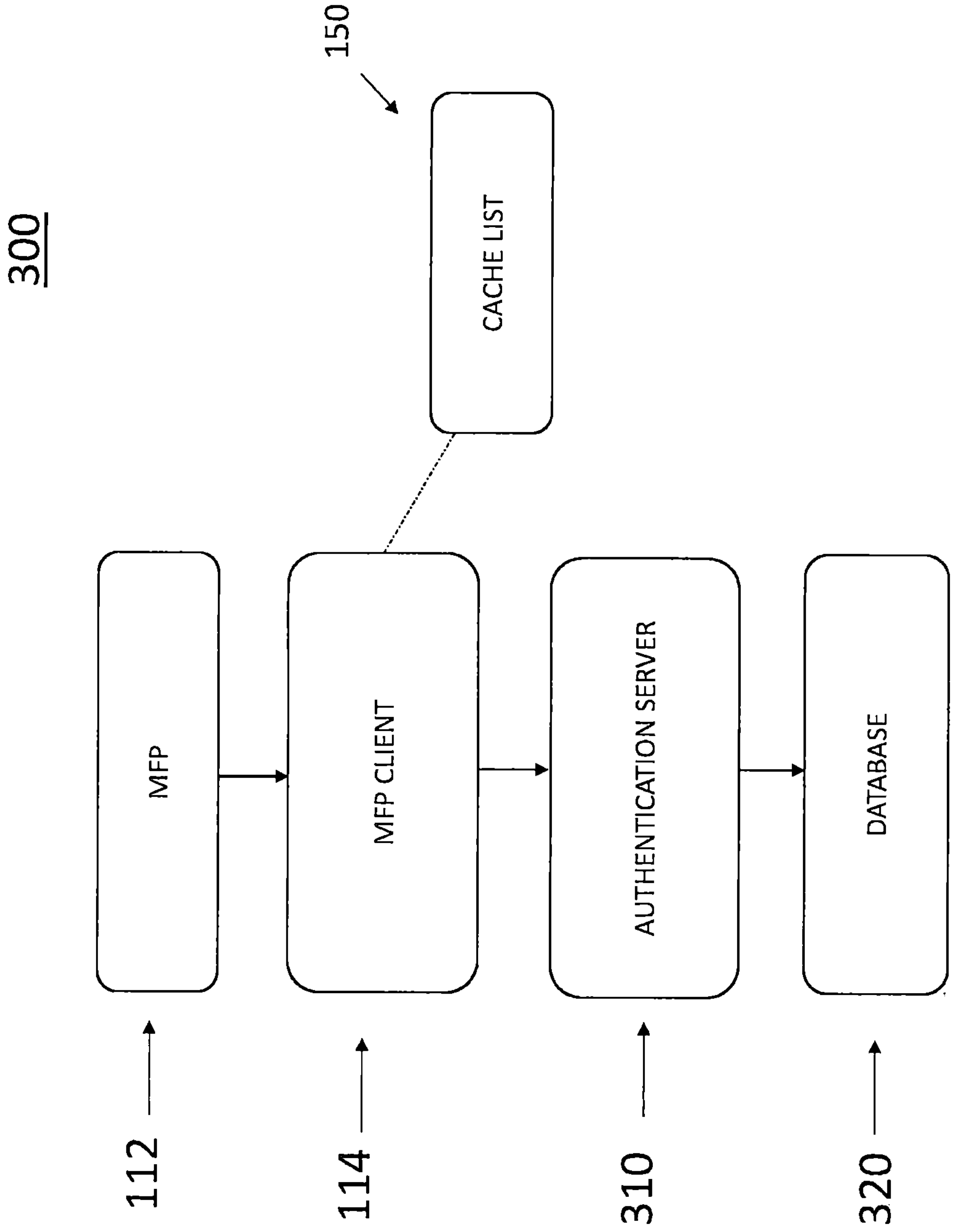
FIG. 3 is an illustration of an infrastructure for authenticating a user in accordance with an exemplary embodiment.

FIG. 3 is an illustration of an infrastructure 300 for authenticating a user 102 on an MFP 112 in accordance with an exemplary embodiment. As shown in FIG. 3, the infrastructure 300 can include the MFP 112, an MFP client 114 hosted on the MFP 112, an authentication server 310, and a database 320 of users 102. The MFP client 114 can store a list of authenticated or authorized users 102 in an encrypted form as a cache list 150 of users 102 that are authenticated or authorized to access the MFP 112. In accordance with an embodiment, the cache list 150 can be a hardware or a software component of the MFP 112.

In accordance with an embodiment, the user 102 via, for example, a mobile device 140, can present an authenticator, for example, a biometric identifier to the MFP 112. The MFP 112 receives the biometric identifier, and compares the biometric identifier to those biometric identifiers that have been stored in the cache list 150. If the biometric identifier of the user 102 has been stored in the cache list 150, the MFP client 114 of the MFP 112 will authenticate the user 102 and issue, for example, an authentication token (e.g., which can include a user identity and authentication cookies) that can be used by the user 102 and the MFP 112 to retrieve resources, for example, managed print services 124, 134 from the one or more computer systems 120, 130.

Alternatively, in accordance with an alternative embodiment, if the biometric identifier of the user 102 received by the computer system 110 (for example, the MFP 112) is not contained within the cache list 150 of the MFP 112, the MFP client 114 can forward the biometric identifier of the user 102 to the authentication provider 130 (for example, an identity provider (IdP)) that can authenticate the biometric identifier of the user 102 via the database 320. If the biometric identifier of the user 102 is contained within the database 320, the authentication server 310 can send an authentication token (for example, which can include a user identity and authentication cookie) to the MFP 112 for the user 102 to access the managed print services 124, 134 hosted on the computer systems 120, 130.

As shown in FIG. 3, the infrastructure 300 can include the authentication server 310 and corresponding database 320 of authorized users 102. For example, the authentication server 310 and the corresponding database 320 can be an identity provider (IdP) 212 (FIG. 2) configured to store and manage digital identities of one or more users 102. The identity provider (IdP) 212 can check an authentication token for the user 102 and if the authentication token is valid, the identity provider can authorize the user 102 to access, for example, one or more replying party applications or managed print services that are hosted on the computer system 110, for example, the MFP 112, or alternatively, with the one or more computer systems 120, 130 (FIG. 1) that can be associated with the identify provider 320. In accordance with an embodiment, the one or more replying party applications can be, for example, managed print services (MPS) for a multifunction peripheral or multifunction printer (MFP) 112.

In accordance with an embodiment, the authentication service 320 (i.e., identity provider (IdP) 212) can be used in a cloud computing environment to manage user identities. In accordance with an embodiment, if the user 102, or alternatively, the user 102 and the computer system 110 has been authenticated by the identity provider (IdP) 212, the computer system 120 associated with the authenticator service 310 (i.e., identity provider (IdP)) can send an authentication token (for example, which can include a user identity and authentication cookie).

Figure 4:
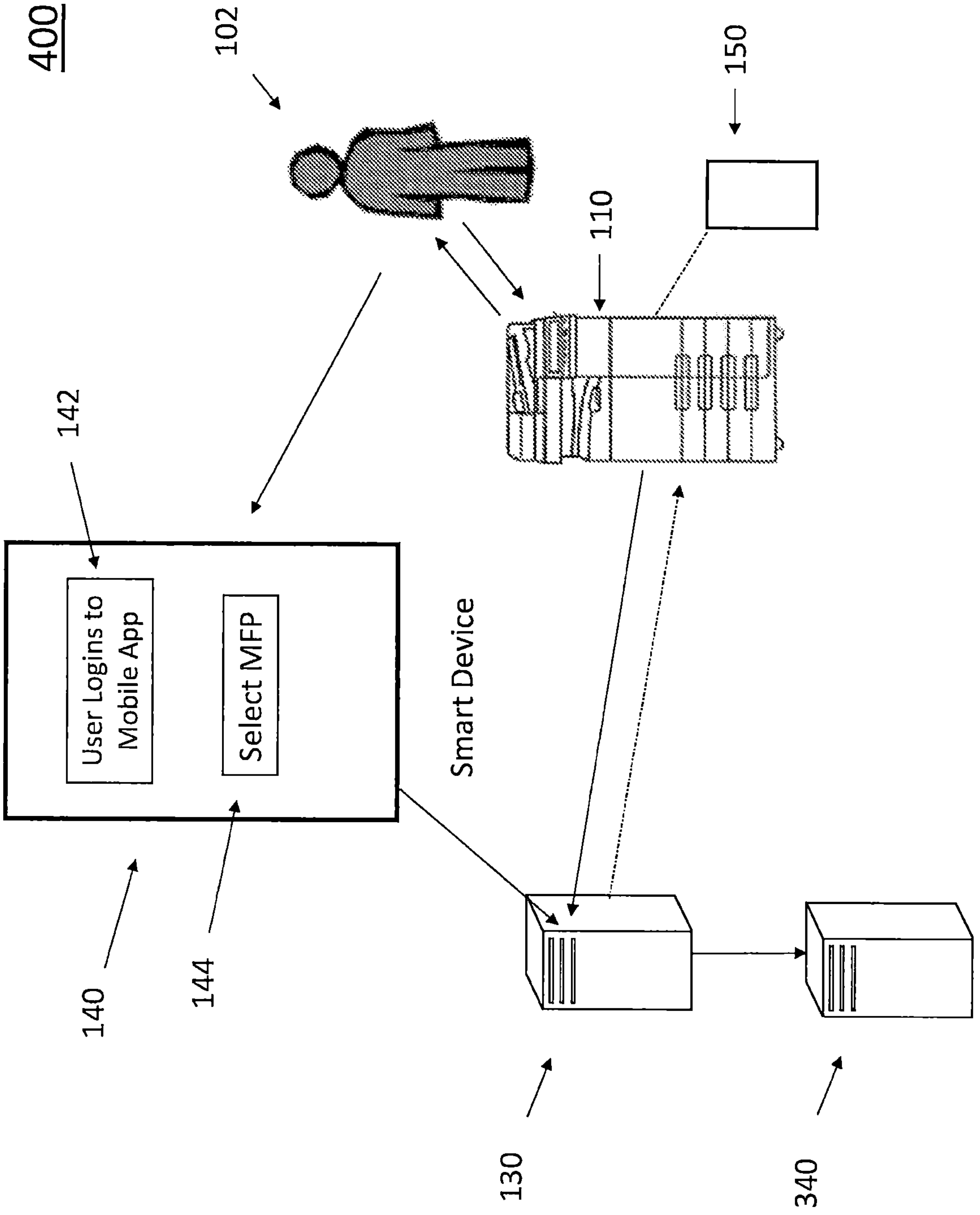
FIG. 4 is an illustration of a flow for authenticating a user in accordance with an exemplary embodiment.

FIG. 4 is an illustration of a flow 400 for authenticating a user 102 in accordance with an exemplary embodiment. As shown in FIG. 4, the user 102 can have a client device 140, for example, in the form of a smart device that hosts a mobile authentication application 142. In accordance with an embodiment, the user 102 can login into the mobile authentication application 142 via, for example, by entering a biometric identifier, for example, a fingerprint or facial recognition of the user 102. In accordance with an embodiment, the biometric identifier can be, for example, the same biometric identifier that the user 102 uses to unlock the client device 140. Once the user 102 has logged into the mobile application 142, the user 102 can be presented with a list of MFPs 144, and the user 102 can select one or more of the MFPs 112 as favorites for pre-authentication. The identity of the selected MFPs 144 by the user 102 can be sent from the client device 140 to a server 130, which processes the authentication request.

In accordance with an embodiment, for example, the multifunction peripheral or multifunction printer (MFP) 112 and/or the managed print services (MPS) can have an acceptance policy, which requires certain authenticators, for example, at least one biometric identifier, two-factor authentication (2FA), or multifactor authentication as an acceptance policy for the registered client device 140, which are verified by the server 130. In accordance with an embodiment, the server 130 can create a database 340 of users 102 that have identified one or more of MFPs 112 as favorites for each of the one or more users 102. The MFP client of the MFP 112 receives the list of user favorites and corresponding authentication information, for example, biometric identifiers or biometric sequences that are then stored in the cache list 150 on the MFP 112. For example, the cache list 150 can be an encrypted cache list 150.

In accordance with an embodiment, a user 102 can access the MFP 112 by opening, for example, the mobile application on the client device 104, which will present the user 102 with a login or sign in screen, which requires the user 102 to enter a password or biometric to unlock the authenticator in the client device 140. The client device 140 uses the user's account identifier provided by the MFP 112 to select the correct authentication method. The client device 140 sends the authenticator back to the MFP 112, which verifies the authenticator and logs in (or signs in) the user 102 into the MFP 112.

In accordance with an embodiment, the MFP 112 can be configured to send a request to the client device 140 for the authenticator upon the client device 140 being brought within a certain distance of the MFP 112. For example, the communications between the client device 140 and the MFP 112 can be via a near field communication or Bluetooth protocol, and the detection of the client device 140 or a tap of the MFP 112 on a reader of the MFP 112. Accordingly, the user 102 can be authorized to access the MFP 112 without an opening of an application on the client device 140. Once, the user 102 has been authenticated on the MFP 112, the user 102 can access, for example, managed print services 124, 134 in which the user 102 has been authorized by, for example, an administrator.

In accordance with an embodiment, the method and system for enhanced authentication as disclosed herein, can also be integrated with one or more federation protocols, for example, Security Assertion Markup Language (SAML), OpenID Connect (OIDC), and Open Authorization (OAuth or OAuth2). In addition, the method and systems as disclosed herein could be leveraged in OAuth2 environments for user authentication prior to user consent and authorization to access a protected resource, for example, the managed print services.

Figure 5:
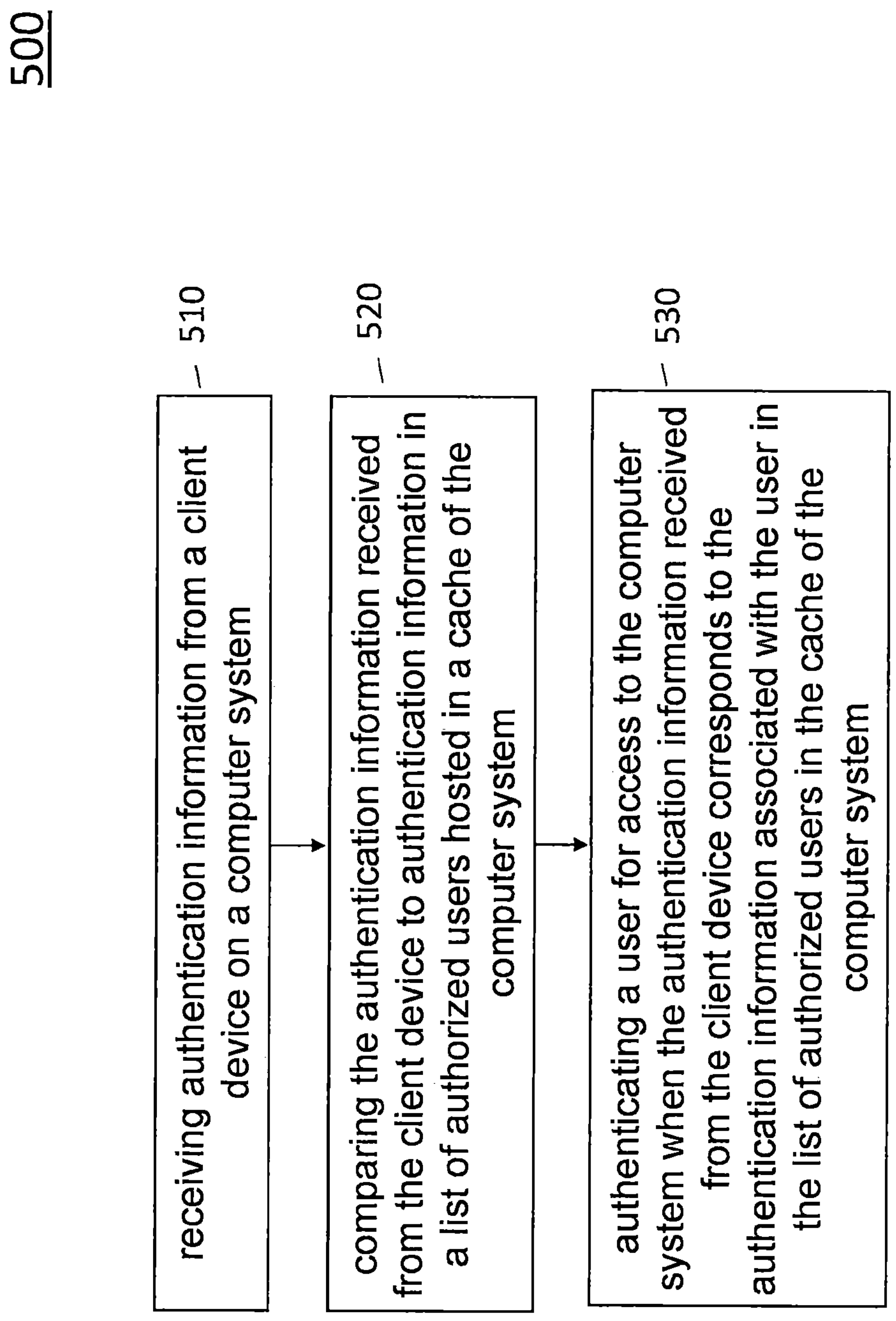
FIG. 5 is a flowchart for a method for enhanced authentication of users in accordance with an embodiment.

FIG. 5 is a flowchart 500 for a method for enhanced authentication of users in accordance with an embodiment. As shown in FIG. 5, the method for enhanced authentication includes in step 510, authentication information is received from a client device on a computer system. In step 520, the authentication information received from the client device is compared to authentication information in a list of authorized users hosted in a cache of the computer system. In step 530, a user is authenticated for access to the computer system when the authentication information received from the client device corresponds to the authentication information associated with the user in the list of authorized users in the cache of the computer system.

In accordance with an embodiment, the method further includes granting the user an authentication token upon the authentication of the user in the list of authorized users in the cache of the computer system, the authentication token configured to provide the user with access to one or more relying party applications. For example, the computer system can be one or more multifunction peripherals or multifunction printers, the client device can be a mobile device, and the method can include accessing managed print services on the one or more relying party applications with the authentication token.

In accordance with an embodiment, the method further incudes encrypting the list of authorized users in the cache of the computer system. The method can include forwarding, by the computer system, the authentication information to an authentication server when the authentication information received from the client device is not associated with the user in the list of authorized users in the cache of the computer system. In addition, the method can include receive, by the computer system, an authentication token for the user from the authentication server when the authentication server authenticates the authentication information. In addition, the method can further include storing the authentication information of the user in the list of authorized users in the cache of the computer system upon receipt of the authentication token for the user from the authentication server. In accordance with an embodiment, the authentication server can be an identity service provider.

In accordance with an embodiment, the computer system is one or more multifunction peripherals or multifunction printers, the client device is a mobile device, and the method further comprises: detecting by the one or more multifunction peripherals or multifunction printers the mobile device of the user via a contactless or touch of the mobile device and the one or more multifunction peripherals or multifunction printers.

In accordance with an embodiment, the method can include updating the list of authorized users in the cache of the computer system at a predetermined time interval. For example, the predetermined intervals can be one or more seconds, for example, every 5 seconds, 10 seconds, 20 seconds, 30 seconds, 45 seconds, one minute, five minutes, 10 minutes, 30 minutes, 60 minutes, etc.

In accordance with an embodiment, the method further comprises receiving by the computer system the list of authorized users to be stored in the cache of the computer system from an external server, the list of authorized users including an authentication sequence for the user to be stored in the cache of the computer system. The authentication sequence can be based on a biometric identifier for the user, and the biometric identifier is from a biometric authenticator device associated with the client device, the biometric authenticator device including one or more of a sensor, a scanning device, or an electronic reader, and wherein the biometric identifier of the user being at least one physiological characteristic of the user, and wherein the at least one physiological characteristic is selected from one or more of fingerprints, palm veins, face recognition, DNA (deoxyribonucleic acid), palm print, hand geometry, iris recognition, retina, and/or odor/scent.

In accordance with an embodiment, the method further includes generating the list of authorized users for each of the users that has been authenticated on the computer system. In addition, the method can include removing the user from the list of authorized user after a predetermined period of time if the user has not accessed the computer system within the predetermined period of time.

In accordance with an embodiment, the client device is a mobile device, a smart phone, or a wearable device, and the computer system is a multifunction peripheral or a multifunction printer, and wherein the method further includes communicating with the computer system via a wireless communication protocol, the wireless protocol being a near-field communication (NFC) or a Bluetooth technology standard, and granting access to the user to one or more managed print services provider by a service provider to the multifunction peripheral or the multifunction printer.

In accordance with an embodiment, the authentication information from the client device to the computer system is a same authentication information as the user uses to access the client device, and wherein the same authentication information being at least one of a biometric identifier or a multifactor authentication.

In accordance with an embodiment, the computer system is a multifunction peripheral or multifunction printer, and the method further includes granting the user access to managed print services hosted by a service provider external to the multifunction peripheral or multifunction printer.

Figure 6:
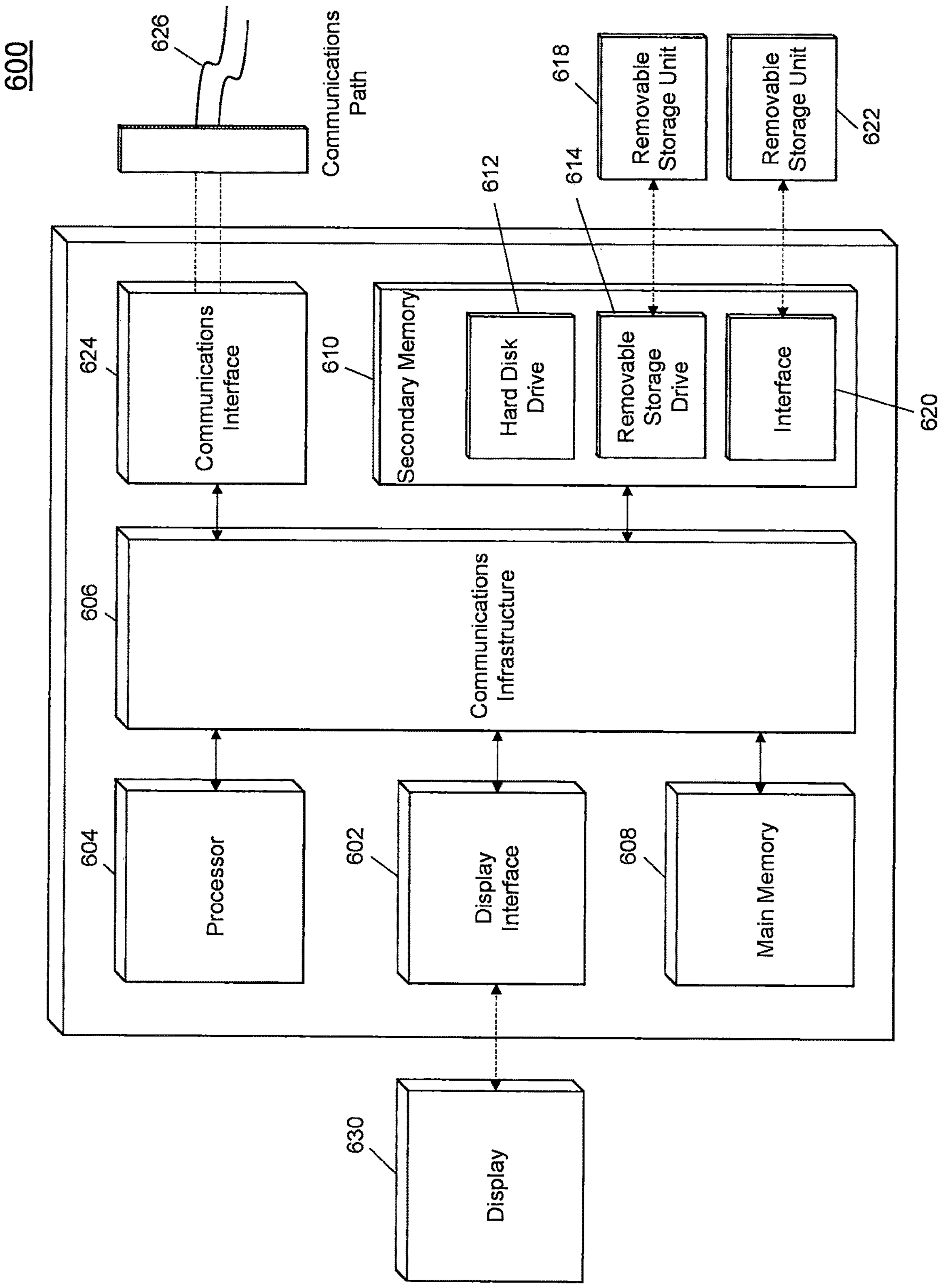
FIG. 6 is an illustration of an exemplary hardware architecture for an embodiment of a computer system.

FIG. 6 illustrates a representative computer system 600 in which embodiments of the present disclosure, or portions thereof, may be implemented as computer-readable code executed on hardware. For example, the one or more computer systems 110, 112, 120, 130, 310, 320, or client devices 140 associated with the method and system for enhanced authentication as disclosed herein may be implemented in whole or in part by a computer system 600 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the presently described method and system.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this representative computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

A processor device 604 may be processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc. Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 1-5, as discussed herein. Accordingly, such computer programs may represent controllers of the computer system 600. Where the present disclosure is implemented using software executed on hardware, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software executed on hardware, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

In accordance with an exemplary embodiment, the methods and processes as disclosed can be implemented on a non-transitory computer readable medium. The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present disclosure may be implemented such that its software part has been written onto a recording medium in advance and will be read as required in operation.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for enhanced authentication, the method comprising:

receiving authentication information of a user from an external server, the received authentication information being sent by the external server to a computer system to add the user to a list of authorized users hosted in a cache of the computer system, and wherein the list of authorized users hosted in the cache of the computer system are pre-cached;

receiving authentication information of the user from a client device on the computer system after the user has been added to the list of authorized users hosted in the cache of the computer system;

comparing the authentication information received from the client device to the authentication information in the list of authorized users hosted in the cache of the computer system;

authenticating the user for access to the computer system when the authentication information received from the client device corresponds to the authentication information associated with the user in the list of authorized users in the cache of the computer system; and updating the list of authorized users in the cache of the computer system upon request of the user via a mobile application or other computer system in communication with the external server.

2. The method according to claim 1, further comprising:

granting the user an authentication token upon the authentication of the user in the list of authorized users in the cache of the computer system, the authentication token configured to provide the user with access to one or more relying party applications.

3. The method according to claim 2, wherein the computer system is one or more multifunction peripherals or multifunction printers, the client device is a mobile device, and the method comprises:

accessing managed print services on the one or more relying party applications with the authentication token.

4. The method according to claim 1, further comprising:

encrypting the list of authorized users in the cache of the computer system.

5. The method according to claim 1, further comprising:

forwarding, by the computer system, the authentication information to an authentication server when the authentication information received from the client device is not associated with the user in the list of authorized users in the cache of the computer system; and receiving, by the computer system, an authentication token for the user from the authentication server when the authentication server authenticates the authentication information.

6. The method according to claim 5, further comprising:

storing the authentication information of the user in the list of authorized users in the cache of the computer system upon receipt of the authentication token for the user from the authentication server.

7. The method according to claim 5, wherein the authentication server is an identity service provider.

8. The method according to claim 1, wherein the computer system is one or more multifunction peripherals or multifunction printers, the client device is a mobile device, and the method comprises:

detecting by the one or more multifunction peripherals or multifunction printers the mobile device of the user via a touch of the mobile device and the one or more multifunction peripherals or multifunction printers.

9. The method according to claim 1, further comprising:

updating the list of authorized users in the cache of the computer system at a predetermined time interval.

10. The method according to claim 1, further comprising:

receiving by the computer system the list of authorized users to be stored in the cache of the computer system from the external server, the list of authorized users including an authentication sequence for the user to be stored in the cache of the computer system.

11. The method according to claim 10, wherein the authentication sequence is based on a biometric identifier for the user, and the biometric identifier is from a biometric authenticator device associated with the client device, the biometric authenticator device including one or more of a sensor, a scanning device, or an electronic reader, and wherein the biometric identifier of the user being at least one physiological characteristic of the user, and wherein the at least one physiological characteristic is selected from one or more of fingerprints, palm veins, face recognition, DNA (deoxyribonucleic acid), palm print, hand geometry, iris recognition, retina, and/or odor/scent.

12. The method according to claim 1, further comprising:

generating the list of authorized users for each of the users that has been authenticated on the computer system.

13. The method according to claim 12, further comprising:

removing the user from the list of authorized user if the user has not accessed the computer system within a predetermined period of time.

14. The method according to claim 1, wherein the client device is a mobile device, a smart phone, or a wearable device, and the computer system is a multifunction peripheral or a multifunction printer, and wherein the method further comprises:

communicating with the computer system via a wireless communication protocol, the wireless protocol being a near-field communication (NFC) or a Bluetooth technology standard; and granting access to the user to one or more managed print services provider by a service provider to the multifunction peripheral or the multifunction printer.

15. The method according to claim 1, wherein the authentication information from the client device to the computer system is a same authentication information as the user uses to access the client device, and wherein the same authentication information being at least one of a biometric identifier or a multifactor authentication.

16. The method according to claim 1, wherein the computer system is a multifunction peripheral or multifunction printer, the method further comprises:

granting the user access to managed print services hosted by a service provider external to the multifunction peripheral or multifunction printer.

17. The method according to claim 1, wherein the pre-caching of the list of authorized users is performed periodically, in response to a change in the list of authorized users, or at system startup.

18. A computer program product for accessing a multifunction peripheral, the computer program product comprising:

a non-transitory computer-readable storage medium having program instructions embodied therewith, the program instructions executable by a computer to cause the computer to perform a process, comprising:

receiving authentication information of a user from an external server, the received authentication information being sent by the external server to the computer to add the user to a list of authorized users hosted in a cache of the computer, and wherein the list of authorized users hosted in the cache of the computer system are pre-cached;

receiving authentication information of the user from a client device on the computer after the user has been added to the list of authorized users hosted in the cache of the computer system;

comparing the authentication information of the user received from the client device to the authentication information in the list of authorized users hosted in the cache of the computer;

authenticating the user for access to the computer when the authentication information received from the client device corresponds to the authentication information associated with the user in the list of authorized users in the cache of the computer; and updating the list of authorized users in the cache of the computer system upon request of the user via a mobile application or other computer system in communication with the external server.

19. The computer program product according to claim 18, further comprising:

granting the user an authentication token upon the authentication of the user in the list of authorized users in the cache of the computer, the authentication token configured to provide the user with access to one or more relying party applications.

20. The computer program product according to claim 19, wherein the computer system is one or more multifunction peripherals or multifunction printers, the client device is a mobile device, and the process comprises:

accessing managed print services on the one or more relying party applications with the authentication token.

21. A multifunction peripheral comprising:

a cache; and a processor configured to:

receive authentication information of a user from an external server, the received authentication information being sent by the external server to the multifunction peripheral to add the user to a list of authorized users hosted in the cache of the multifunction peripheral, and wherein the list of authorized users hosted in the cache of the computer system are pre-cached;

receive authentication information of the user from a client device after the user has been added to the list of authorized users hosted in the cache of the computer system;

compare the authentication information received from the client device to the authentication information in the list of authorized users hosted in the cache of the multifunction peripheral;

authenticate the user for access to the multifunction peripheral when the authentication information received from the client device corresponds to the authentication information associated with the user in the list of authorized users in the cache of the multifunction peripheral; and update the list of authorized users in the cache of the computer system upon request of the user via a mobile application or other computer system in communication with the external server.

* * * * *